Dec. 23, 1952  C. C. JENKINS  2,622,458
GUIDE DEVICE FOR HAND OR ELECTRIC DRILLS
Filed Aug. 18, 1950  2 SHEETS—SHEET 1

CHARLES C. JENKINS,
INVENTOR.
HUEBNER, BEEHLER, WORREL,
& HERZIG,
ATTORNEYS.
BY Albert M Herzig Dec. 23, 1952                C. C. JENKINS                2,622,458
GUIDE DEVICE FOR HAND OR ELECTRIC DRILLS
Filed Aug. 18, 1950                2 SHEETS—SHEET 2
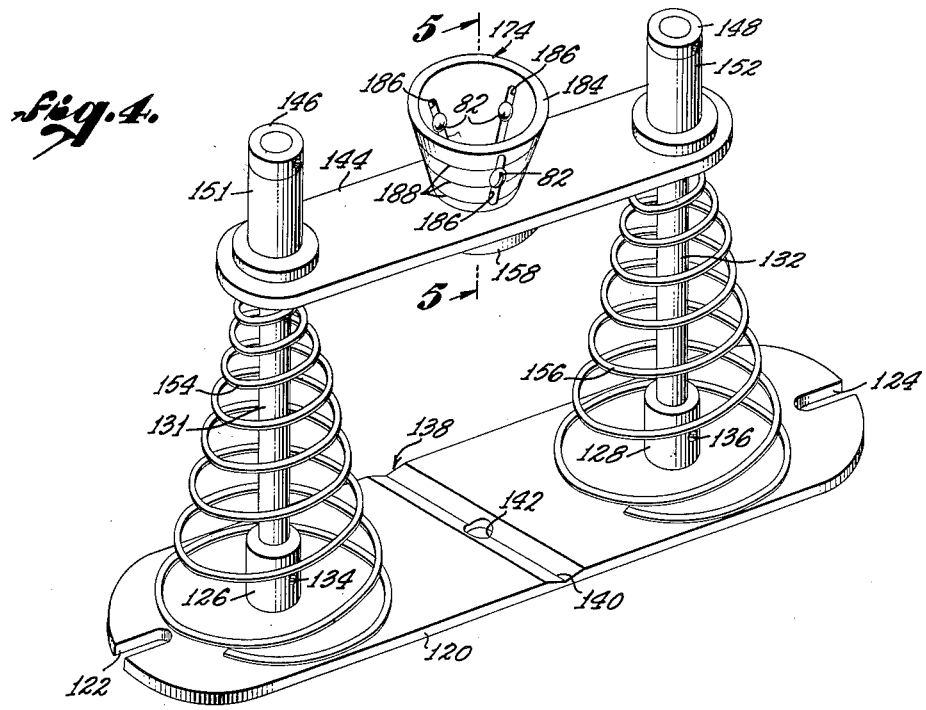
CHARLES C. JENKINS,
INVENTOR.
HUEBNER, BEEHLER, WORREL,
& HERZIG,
                       ATTORNEYS.
BY Albert M Herzig Patented Dec. 23, 1952

2,622,458

UNITED STATES PATENT OFFICE 2,622,458

GUIDE DEVICE FOR HAND OR ELECTRIC DRILLS

Charles C. Jenkins, Los Angeles, Calif.

Application August 18, 1950, Serial No. 180,130

6 Claims. (Cl. 77—55)

This invention relates to a rotary guide device for a drill chuck such as may be used for example, with a power or hand-driven drill. In general, the employment of such a drill is typified, though not limited, by its use in drilling metal rod or bar stock.

Another object of the invention is to provide an attachment to keep a drill bit of the egg beater or electric hand-drill type traveling in a true perpendicular course relative to a work surface.

One object of the invention is to provide a rotatable spindle support of great adjustability which is adapted to engage drill chucks of different dimensions and/or taper.

In a preferred embodiment, the invention provides a cup-shaped or inverted frusto-conical support having engaging means by which the guide is adapted to receive in driving engagement, a drill chuck of different taper than the guide, whether or not the end of the chuck will rest upon the bottom of the guide cup or not. In the event that there is used a chuck having an external taper similar to the internal taper of the guide member, the latter may also be employed therewith without the present engaging units.

Another object is to provide an improved and adjustable support for such a rotatable guide device, which support automatically holds the guide in alignment with the workpiece while moving toward and away from the same.

A further object resides in the production of an improved standard adapted to rotatably support a guide which will accommodate drill chucks of varied dimensions. Such standard includes a cradle adapted to hold the workpiece in alignment with the drill and guide member.

Yet another object is to provide such an improved standard which is compact, easily transportable and may be quickly attached to a workbench or the like in either a horizontal or vertical position.

An additional object of the invention is to provide two-piece adjustable engagement units for employment in such a guide device.

A further object resides in the provision of such engaging units which may be set at a desired position from either the inside or outside of my drill chuck holder.

Still another object is to provide such a guide device embodying quick indexing means for setting the engaging elements thereof.

Other and further objects and advantages of my invention will become apparent from the drawings and the specifications relative thereto.

In the drawings:

Figure 4 is a perspective view showing a modified form of standard or mounting assembly embodying my drill chuck holder;

Figure 5 is a vertical sectional view taken through the holder of Figure 4 along the line 5—5 with a drill chuck and bit shown in lateral elevation therein; the inner surface of the frusto-conical guide member or drill chuck support should perferably, although not necessarily, be of a size approximating that of the tapered portion of the chuck, rather than as disproportionate in size as that illustrated in Figure 5; and Figure 6 is a sectional view taken through my chuck holder and showing a modified form of engaging element therein.

In practising the invention, my guide device for a rotary spindle may desirably be incorporated in a handy or easily transportable unit which includes a pair of mutually aligned supporting elements, one for the guide device and the other for a work-piece, which aligned supports are designed to move toward each other synchronously with penetration of the work-piece by a drill bit.

Figure 1:
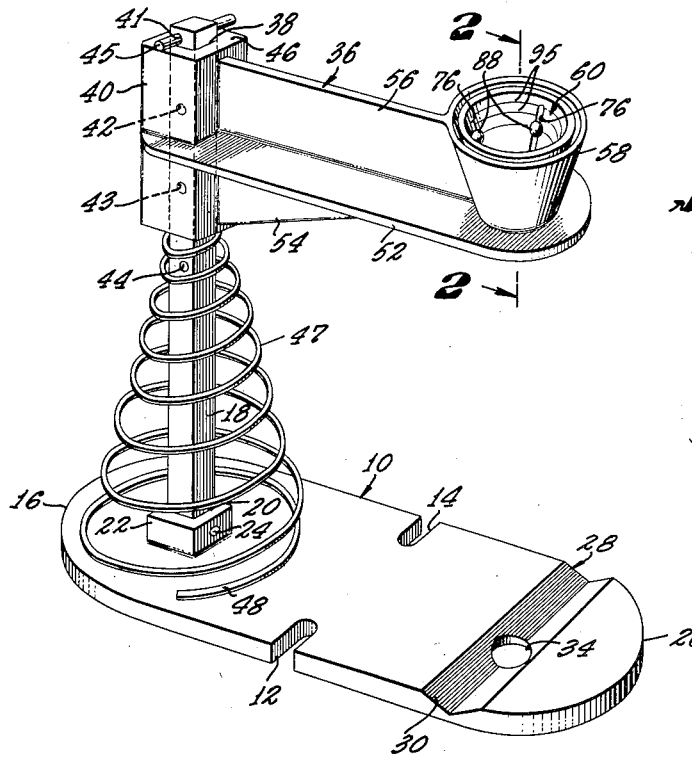
Fig. 1 is a perspective view of one form of my drill chuck guiding device shown mounted on a standard of the type which may be connected to a work bench or the like in use.

In the construction particularly illustrated in Fig. 1, there is provided a generally flat base plate 10 of elongated form, adapted to be placed on a table or work bench and rigidly secured thereto by means of a suitable vise, bolts, screws, nails or the like, (not shown) which engage the same along the slots 12—14 in a conventional manner. Adjacent one end 16 of the base plate there is located an upstanding post 18 generally square or polygonal in cross section and lodged in a corresponding socket 20 formed by a footing member or boss 22 on the upper face of the base plate, the post being detachably held therein by means of a screw 24 or other suitable mechanism. At the opposite end 26 of the base plate there is formed a transverse cradle 28 adapted to receive a workpiece (not shown) and characterized typically by a longitudinally directed V-notch 30 cut downward from the upper face thereof. A transverse aperture 34 generally parallel to the post 18 is centrally formed in the cradle for a purpose which will shortly be evident. The cradle may be formed integral with the base plate 10 or separate as desired.

The work may be placed either above or below the base of either embodiment of this invention.

Upon the upper end of the post 18 a suspension arm 36 is slidingly mounted by means of an upright rectangular passage or keyway 38 formed therein so as to define an oblong sleeve 40 movable lengthwise along the post without rotation thereabout. In order to locate the suspension arm at various elevations along the post, there are provided a number of transverse sockets 41, 42, 43, 44 vertically spaced apart therealong and adapted to receive a cylindrical locking pin 45 therethrough. The upper edge 46 of the sleeve 40 thus abuts against the projecting ends of the pin 45 and is restrained against further upward movement. The opposite or lower end of the sleeve is in turn resiliently supported by a flat-sided expansion spring 47 disposed about the post between the base plate 10 and the arm 36. At its lower end 48 the spring is disposed in frictional engagement with the upper face of the plate 10. Accordingly, it will be seen that the tendency of the spring is to urge the suspension arm 36 away from the base plate 10 to the extent permitted by the locking pin 42, while at the same time allowing the arm to be pressed downward toward the plate without twisting or misalignment by operational movement of a drill chuck carried in the guide member.

The suspension arm 36 is constructed with a flat shelf or platform 52 projecting laterally from a midpoint of the sleeve section 40 and disposed generally parallel with the base plate 10 below. A fin 54 serves to support the platform from beneath while a vertical reinforcing rib 56 extends centrally outward from the sleeve along the upper face of the shelf. Adjacent the outer end of the arm, the rib 56 is joined to a tapered tube or cup-like member 58 which is open at both ends and increases in diameter upwardly. My frusto-conical guide member or drill chuck support 60 is rotatably and preferably axially removably mounted within the cup 58 by means of an annular raceway 62 formed by complementarily curved annular race members 64, 66, between which are located a plurality of roller or other bearings, 68, adapted to prevent radial wobbling movement. The inner surface of the inner annulus 64 is preferably tapered for removable insertion of the outer face of a preferably correspondingly tapered neck or "sight" channel 70 of the guide, while the outer annulus 66 is fixedly imbedded in the shelf 52 of the suspension arm. Upwardly from a basal ledge 72 at the mouth of the neck 70, the conical side walls 74 of the guide member slant outward at a taper generally corresponding to that of the stationary cup 58, being spaced apart inwardly a small amount therefrom.

Figure 3:
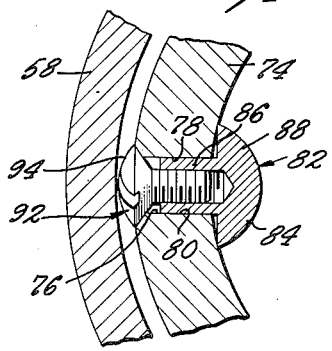
Figure 3 is a sectional view of a construction detail showing the manner of mounting a two-piece adjustable chuck-engaging element within a slot of the guide wall.

A series of longitudinal adjustment slots 76, here shown as three in number, are formed in the walls 74 of the guide 60. These slots are circumferentially spaced apart an equal distance and are individually characterized by parallel side walls 78, 80 (Figure 3). A two-piece engaging unit 82 is disposed in each slot, one part 84 of which is provided with a non-circular shank 86 of an external width approximating the clearance between the parallel walls 78, 80 of the slot. An enlarged or flanged head 86, generally arcuate or dome-shaped, is disposed to overlie the edges of the slot so as to abut against the corresponding face of the guide wall 74. The shank 86 is provided with a tapped socket within which there is threadedly received a screw 92 inserted from the opposite side of the slot. This latter screw 92 is also provided with an enlarged head 94 adapted to overlie or abut against its respective slot edges, similar to the opposing head 84 along the opposite face of the guide 60. Accordingly, it will be seen that the several engaging units may be loosened and raised or lowered to any desired level within their respective slots wherein they may be mutually aligned by the operator by reference to an axial series of circumferential guide lines 95 scored or otherwise marked within (and/or without) the guide 60.

The illustrated chuck 98, which is connected by a drive shaft 100 to a suitable source of power (not shown), is provided with tapered jaws 102 which grasp a drill bit 104 between them. When of a size and/or taper corresponding to the interior of the guide 60, the chuck may be inserted therein in driving relation without use of the engaging units 82. In any event, the bit thus mounted projects down through the aperture 108 of the guide member 60 which is held by the suspension arm 36 in alignment with the opening 34 in the cradle immediately beneath. Thus the aperture 108 and guide structure 60 act as a "sight" for directing the drill bit to the workpiece. When, however, the taper of the chuck 98 differs from the inside taper of the guide 76, then the engaging units 82 are located to contact either the lower or upper periphery of the tapered portion of chuck, whichever periphery is smaller in diameter than the corresponding portion of the inner surface of the guide 76, while the opposite periphery of the chuck is disposed in sliding frictional engagement with the inner rim 107 of the guide.

In this connection it is important to note that the arcuate curvature of the inner head 84 of the engaging members allows the chuck to abut or lodge itself against them with automatic centering or self-adjustment regardless of the rotational position to which the head may be turned. Accordingly, in operation, the workpiece is placed in the cradle 28, with the spot which is to be drilled located directly beneath the "sight" opening 70 of the guide unit. The chuck-engaging members 82 are set at the desired height to engage the drill spindle, which thus secured, rotates the supporting cup 74 in unison with the bit 104. As the hole in the workpiece is deepened, the suspension arm 36 and sleeve 40 slide down along the post 18 by pressure of the drill overcoming the tension of the spring 47.

Figure 2:
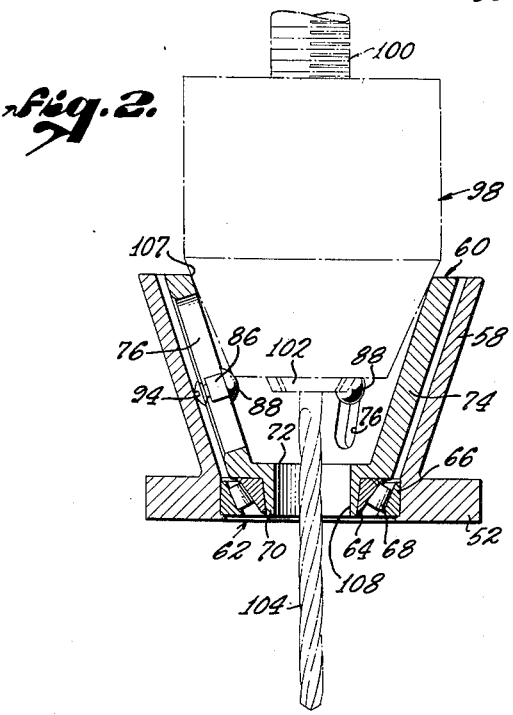
Figure 2 is a vertical sectional view taken through the guide unit along the line 2—2 of Figure 1, with a drill chuck and bit shown in side elevation, in operative position within the guide.

As illustrated in Fig. 2, an extreme of upward positioning of the chuck within the guide is shown, occasioned mainly by the extreme taper of the chuck relative to the guide. In the modified form of the invention, an opposite relationship is shown. Preferably, however, the parts will be designed to achieve a medium between these extremes, or adapted for specific use.

By the preferred embodiment of my invention illustrated in Figs. 4, 5, the rotary spindle guide (60) is employed without the tubular mounting cup 58, and its suspension arm is adjustably supported at both ends instead of only one. In assembly there is again provided a relatively flat base plate 120 of somewhat elliptical outline, and formed with terminal slots 122—124 for attachment to a work bench or the like by any suitable securing means as heretofore stated. A pair of annular bosses 126, 128 are disposed adjacent opposite ends of the plate so as to individually receive therein an upstanding post 131, 132 anchored in place by a suitable set screw 134, 136 or the like. Accordingly, the cradle 138 is centered between the two posts and formed with a centrally apertured, transversely directed V-slot 140 for holding a workpiece therein. This aperture 142 is in vertical alignment with the upper drill guide as before. Slidingly supported on the two posts is a generally flat, cross arm 144 which is retained thereon by a pair of locking collars 146, 148, secured to the free ends of the posts, and also, if desired, by suitable spacing collars 151, 152 located between the locking collars and the upper face of the cross arm. On its opposite face the cross arm is carried jointly by a pair of extension springs 154, 156 disposed about the respective posts 131, 132 with their lower ends in abutment with the base plate 120.

The suspension arm 144 is centrally apertured in line with the opening 142 of the cradle and provided with a dependent L-shaped box extension 158 (Figure 5) which serves to support a thrust bearing 160 formed by a pair of inner races and outer races 162, 164 with ball bearings 170 formed jointly therebetween. The outer race 162 is permanently connected to the supporting annulus 158 while its inner race 164 is secured to a dependent tubular section or "sight" 172 of the guide member 174. Above this lower sight the guide member is peripherally enlarged in the form of a step or elbow 176 which is centered within the socket 178 formed by the dependent ring 158.

The body or cup section of the spindle guide is provided with upwardly diverging frusto-conical side walls 184 which are formed with a circumferential series of axially directed slots 186 spaced apart equidistant thereabout. In each slot is mounted the two-piece chuck-engaging units 82 which are mutually alignable in a horizontal plane by means of guide lines 188.

By this construction it will be observed that the maintenance of alignment of a drill bit 190 is effected in part by a composite or tubular race-way 160 having a plurality of channels vertically spaced apart, and in part by balanced support of the cross arm 144 upon the pair of posts 130 and 132. Likewise the provisions of two posts to support the suspension arm eliminates the requirement of having a post keyed to the sliding collar as in the earlier described form.

Yet another form of two-piece engaging unit is shown in Figure 6. This unit may be used instead of the pair of interlocking screws 82 in the construction of Figure 4. It consists of a socket member 192 and a screw member 194, the latter having an outwardly projecting slotted head 196 and a radially restricted shank 198, bearing screw threads adjacent the free end thereof. The socket member 192 is shaped somewhat like an arcuate-faced button, in this case the arcuate surface 200 being disposed adjacent the inner wall 184 of the guide, in the center of which face the screw shank 198 after insertion through the slot 186a is received in a corresponding internally threaded socket. The inner face of the guide wall 184 is also formed with a spherical or arcuate socket 202 which is disposed in sliding registration with the arcuate surface 200, similar to a ball-and-socket joint.

The opposite face 204 of the socket member is more or less flat and can be tilted, by movement of the attached screw 194 up or down in the axial slot 186a, so as to angularly dispose the plane of the face parallel to the slanted side of the drill chuck, whereupon the screw 194 is set so as to hold the engaging face 204 in this position. A particular advantage of this construction is that each engaging member 192 can readily be adjusted against the chuck by means of the screw 194 from outside the guide cup 174 without first precisely setting the three (or more) engaging members along a common horizontal plane. Also, the button-shaped member 194 contacts a greater area of the drill chuck or spindle than does an arcuate screw head 84 of the same size. In order to facilitate accurate alignment of the members 192 and their screws 196, horizontal guide lines are preferably correspondingly scribed around the outer surface of the guide.

By each of the foregoing embodiments, it will be seen there is obtained both a guided movement of the drill bit to and from the workpiece, and an adjustable support of different size spindles or drill chucks within the upper guide unit. Further, the action of the springs 47 or 154, 156 serves both to balance the suspension arm 144 on its posts and to ease lifting the drill bit from its base formed in the workpiece. Thus the retraction of the chuck and drill guide is effectuated by a balanced arrangement of structural elements according to the present construction.

While I have herein shown and described my invention in what I have conceived to be the most practical and preferred embodiments, it is recognized that departures may be made therefrom within the scope of my invention, which is not to be limited to the details disclosed herein, but is to be accorded the full scope of the claims so as to embrace any and all equivalent devices.

Having thus described my invention, what I claim as new and desire to secure by Letters Patent is:

1. In a generally frusto-conical spindle support adapted to receive a tapered drill chuck in driving engagement therein, the improvement comprising: walls defining a plurality of elongated, parallel guideways formed through said support, each of said guideways being circumferentially spaced apart equidistant about the conical wall of the support; a two piece engaging element disposed in each guideway and consisting of interlocking screw and socket members, each of which has an enlarged head the under face of which is adapted to tightly grip its respective side of the support wall upon being coupled to the opposing member, the inner of which heads is arcuate and projects inward from the inner face of said support so as to form a point of frictional engagement for a drill chuck inserted in the support thereagainst in driving relation; and the wall of which spindle support carries an axial series of circumferential guide lines whereby the engaging elements of the several guideways are mutually alignable.

2. The device of the preceding claim wherein the inner face of the conical spindle support is formed with an arcuate socket centered at each guideway and providing a seat for the arcuate head of the inner member of said two piece engaging element.

3. An article of manufacture comprising, in combination: a base plate having means for attachment to a work bench and the like; a transversely apertured cradle adapted to support a workpiece therein for drilling same in line with said aperture, said cradle being carried by the base plate; an upstanding post secured to said base plate adjacent said cradle; a cross arm slidingly mounted on said post and having a drill-receiving aperture in line with said cradle aperture; resilient means associated with said post and adapted normally to hold apart said cross arm and aligned cradle; a generally frusto-conical spindle support adapted to receive a tapered drill chuck in driving engagement therewith, which support is rotatably mounted on the cross arm and centered about the drill-receiving aperture thereof; walls defining a plurality of elongated, parallel guideways formed through said support, each of said guideways being circumferentially spaced apart equidistant about the conical wall of the support; a two piece engaging element disposed in each guideway and consisting of interlocking screw and socket members, each of which has an enlarged head the under face of which is adapted to tightly grip its respective side of the support wall upon being coupled to the opposing member, the inner of which heads is arcuate and projects inward from the inner face of said support so as to form a point of frictional engagement for a drill chuck inserted in the support thereagainst in driving relation; and the wall of which spindle support carries an axial series of circumferential guide lines whereby the engaging elements of the several guideways are mutually alignable.

4. An article of manufacture comprising, in combination: a base plate having means for attachment to a work bench and the like; a transversely apertured cradle adapted to support a workpiece therein for drilling same in line with said aperture, said cradle being carried by the base plate; a pair of upstanding posts secured to said base plate on opposite sides of the cradle; a cross arm slidingly mounted on said posts and having a drill-receiving aperture in line with said cradle aperture; resilient means adapted normally to separate said cross arm and aligned cradle; a generally frusto-conical spindle support adapted to receive a tapered drill chuck in driving engagement therein, which support is rotatably mounted on the cross arm and centered about the drill-receiving aperture thereof; walls defining a plurality of elongated, parallel guideways formed through said support, each of said guideways being circumferentially spaced apart equidistant about the conical wall of the support; a two piece engaging element disposed in each guideway and consisting of interlocking screw and socket members, each of which has an enlarged head the under face of which is adapted to tightly grip its respective side of the support wall upon being coupled to the opposing member, the inner of which heads is arcuate and projects inward from the inner face of said support so as to form a point of frictional engagement for a drill chuck inserted in the support thereagainst in driving relation; and the wall of which spindle support carries an axial series of circumferential guide lines whereby the engaging elements of the several guideways are mutually alignable.

5. In a drill guide for a tapered drill chuck a generally frusto-conical spindle support adapted to receive the tapered drill chuck in driving engagement therein, a relatively stationary support arm having a horizontal combined thrust and rotational bearing on the arm in supporting engagement with the spindle support, a base and a supporting column for said arm, said spindle support having three substantially equal slots in the wall thereof extending obliquely inwardly and downwardly at the same angular pitch as the wall, and an engaging element slidably mounted in each slot, each engaging element having an inwardly directed smooth walled head adapted to frictionally engage the spindle and tightening means between the engaging element and the spindle support adapted to anchor the engaging element in the slot in a position wherein all engaging elements are in relatively the same selected positions of adjustment.

6. In a drill guide for a tapered drill chuck a generally frusto-conical spindle support adapted to receive the tapered drill chuck in driving engagement therein, said spindle support having three substantially equal slots in the wall thereof extending obliquely inwardly and downwardly at the same angular pitch as the wall, and an engaging element slidably mounted in each slot, each engaging element having an inwardly directed smooth walled head adapted to frictionally engage the spindle and tightening means between the engaging element and the spindle support adapted to anchor the engaging element in the slot in a position wherein all engaging elements are in relatively the same selected positions of adjustment.

CHARLES C. JENKINS.

REFERENCES CITED

The following references are of record in the file of this patent:

UNITED STATES PATENTS

| Number | Name | Date |
|---|---|---|
| 712,367 | Dummer | Oct. 28, 1902 |
| 1,813,785 | Weber | July 7, 1931 |
| 2,379,182 | Porter et al. | June 26, 1945 |